UNITED STATES PATENT OFFICE.

RUDOLF JENKNER, MARIE JENKNER, AND JOHANN PLEYL, OF FLORIDSDORF, NEAR VIENNA, AUSTRIA-HUNGARY.

INSECTICIDE-FERTILIZER.

No. 824,791. Specification of Letters Patent. Patented July 3, 1906.

Application filed September 28, 1904. Serial No. 226,383.

*To all whom it may concern:*

Be it known that we, RUDOLF JENKNER, MARIE JENKNER, and JOHANN PLEYL, subjects of the Emperor of Austria-Hungary, residing at Floridsdorf, near Vienna, in the Empire of Austria-Hungary, have invented certain new and useful Improvements in a Composition of Matter Adapted for Use as an Insect-Killer and a Manure, of which the following is a specification.

This invention relates to an insect-killer which is particularly adapted to destroy phylloxeræ and other vegetable parasites and to act at the same time as a manure which fertilizes the vegetable or plant to which it is applied.

The invention is based on the novel discovery that the poisonous compounds of the cyanogen series—such as cyanid of potassium and the like—destroy phylloxeræ and other injurious parasties within a comparatively short time, whereas they do not attack the vegetables or plants themselves. By adding to such compounds suitable nitrogenous compounds—such as ammonia, sulfate of ammonia, or other salts—a manure is obtained by which the development of plants is greatly assisted. The addition of salts of ammonia also has the advantage that it assists the distribution of the poisonous cyanogen compounds, since the gas evolved by the salts and saturated with cyanid rapidly envelops the plants and permeates the soil surrounding the roots, and thus reaches each fiber and outlying part of the latter. Since the evolution of this disinfectant gas is assisted by heat, it is desirable to add to the cyanogen compounds and salts of ammonia a suitable proportion of quicklime, the latter being in that condition in which it is caused to crumble into dry powder by the addition of a small quantity of water. When the mixture of cyanid, salts of ammonia, and lime is moistened with a sufficient quantity of water, the absorption of the water is accompanied by the development of a considerable amount of heat. By this means the mixture is rendered very intimate, and the evolution of gas in the manner desired is secured.

To reduce the cost of the disinfectant manure and increase its efficiency, it is desirable to use for its manufacture besides potassium cyanid residues from the distillation of illuminating-gas from coal when the so-called "iron" process has been used for cleansing the gas. Such residues are, for instance, ferricyanid of ammonium, cyanid of ammonium, and sulfocyanid of ammonium, and these substances are added to the mixture in a pulverized form. It is also desirable to add to the mixture a decoloring agent—such as aluminium hydrosilicate, magnesium hydrosilicate, chlorid of lime, hydrate of alumina, or the like—by which so-called "lakes" are formed with the coloring-matter in the mixture, so that the said coloring-matter does not act on the plants. At the same time the fertilizing matter contained in the decoloring agents is destructive to the animal life of the insects and parasites on the plants.

The following mixing proportions will serve to illustrate the invention by way of example: pulverized quicklime, fifty-eight to sixty per cent., by weight; solid pulverized cyanid of potassium, one-sixteenth per cent., by weight; ammonia or salts (pulverized) of ammonia, eight per cent., by weight; pulverized residues of distillation obtained in the manufacture of coal-gas, sixteen to eighteen per cent., by weight; solid pulverized decoloring agents, sixteen to seventeen per cent., by weight.

The residues of distillation obtained in the manufacture of coal-gas when the iron process is used for purifying the gas have not always the same composition; but on the average the composition may be stated in per cent., by weight, approximately as follows:

|  | Regenerated. | | |
|---|---|---|---|
|  | Once. | Four times. | Eight times. |
| Sulfate of ammonia | 0.20 | 1.25 | 0.77 |
| Ferricyanid of ammonium and cyanid of ammonium. | 1.00 | 3.00 | 4.40 |
| Sulfocyanid of ammonium | 4.69 | 7.82 | 14.08 |
| Ferrous hydrate and ferric hydrate. | 41.82 | 26.90 | 16.82 |
| Prussian blue | 5.93 | 7.54 | 11.12 |
| Sulfur | 15.24 | 28.20 | 33.50 |
| Sawdust, tar, and the like | 31.12 | 24.72 | 19.31 |
|  | 100.00 | 100.00 | 100.00 |

As a decoloring agent the following mixture can be used: silica, 56.53 per cent., by weight; alumina or hydrate of alumina, 11.57 per cent., by weight; magnesia, 6.29 per cent., by weight; ferric oxid, 3.32 per cent., by weight; calcium oxid, 3.06 per cent., by weight; water, 17.59 per cent., by weight; alkali, 1.28 per cent., by weight.

The constituents of the disinfectant manure are intimately mixed while dry and finely pulverized, whereupon they form a highly-efficient means for destroying phylloxeræ and other insects and parasites of plants. A suitable quantity thereof, amounting, for instance to five decagrams, but varying according to the stage of the disease and the nature of the soil, can be inserted into a small conical recess in the earth surrounding the stem of the plant, the said recess being made by removing a portion of the said earth. The plant is then liberally watered, the stem being preferably somewhat loosened before this is done by imparting to it a slight circular movement. When the water has been absorbed by the soil, the recess is filled up with earth, and it will be found that after the lapse of a few weeks the leaves of the plant acquire a healthy color of dark-green tint, the growth of the plant being powerfully stimulated and the parasites destroyed. The disinfectant manure can of course also be mixed with water to form a paste or liquid mass, with which plants attacked by parasites are coated or sprayed. By this means also the complete destruction of the parasites is obtained.

The preparation can be applied to vine-plants and to any other plants the development of which is interfered with by parasites. In the case of vines it is preferably applied when the leaves are just appearing or shortly before the plants are tied up. Other plants with strong stems can be treated in the same manner as vines. In the case of plants developed from seed the preparation can be sprinkled over the soil when the leaves appear, this being preferably done before or during the fall of rain.

An important advantage of the preparation lies in the fact that the chemicals on which its action depends act in a nascent state—that is to say, during the reactions which take place when the preparation is applied. A partial effect of the application can be observed after the lapse of from ten to fifteen days. The plant itself is not attacked by the preparation, and the flavor of the fruit is not affected. The growth and development of the plant are, in fact, as already explained, assisted at the same time as the disease is removed.

Having now fully described our invention, we declare that what we claim is—

1. An insecticide consisting of a soluble poison of the cyanogen series to which quicklime is added the mixture serving, when acted upon by water, to evolve a poisonous-bearing aqueous vapor.

2. A combined insecticide and manure consisting of a soluble poison of the cyanogen series to which quicklime and nitrogenous compounds are added the mixture serving, when acted upon by water, to evolve a poisonous-bearing aqueous vapor.

In testimony whereof we affix our signatures in presence of two witnesses.

RUDOLF JENKNER.
MARIE JENKNER.
JOHANN PLEYL.

Witnesses:
ALVESTO S. HOGUE,
AUGUST FUGGER.